United States Patent
Schröer et al.

(10) Patent No.: US 6,257,909 B1
(45) Date of Patent: Jul. 10, 2001

(54) ROTARY JOINT WITH FLAT CONDUCTOR AND CIRCULAR CONDUCTOR

(75) Inventors: Frank Schröer, Weiden; Wolfgang Reber, Tirschenreuth, both of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/327,969

(22) Filed: Jun. 8, 1999

(30) Foreign Application Priority Data

Jun. 9, 1998 (DE) .............................................. 198 25 692

(51) Int. Cl.⁷ ...................................................... H01R 3/00
(52) U.S. Cl. ............................................................ 439/164
(58) Field of Search ................................ 439/164, 11–15

(56) References Cited

U.S. PATENT DOCUMENTS

| 5,059,134 | * | 10/1991 | Schauer et al. | 439/164 |
| 5,348,490 | * | 9/1994 | Schauer et al. | 439/164 |
| 5,762,507 | | 6/1998 | Mochizuki et al. | |

FOREIGN PATENT DOCUMENTS

| 42 21 238 A1 | 4/1993 | (DE) . |
| 42 35 056 C2 | 4/1994 | (DE) . |
| 43 22 443 A1 | 1/1995 | (DE) . |
| 196 04 797 A1 | 8/1996 | (DE) . |
| 195 25 686 A1 | 1/1997 | (DE) . |

* cited by examiner

*Primary Examiner*—Gary F. Paumen
*Assistant Examiner*—Phuongchi Nguyen
(74) *Attorney, Agent, or Firm*—Sughrue, Mion, Zinn, Macpeak & Seas, PLLC

(57) ABSTRACT

A rotary joint with two housing parts (1, 2) rotatable with respect to each other, which are connected by a flexible flat conductor (10) that extends in spires within an interstice (11) of the housing parts (1, 2) and is attached at its end to a contact element (23), which connects a strand (27) of the flat conductor (10) with a circular conductor (5, 7) and which is arranged in a holder (21) in a housing part (1, 2). The contact element (23) of the rotary joint is a one-piece metal part having a surface (26) to which the strand (27) of the flat conductor (10) is permanently fixed, the contact element is attached to the circular conductor (5, 7) by crimping, and each contact element (23) is fixed within a holder (21) assigned to it.

8 Claims, 3 Drawing Sheets

ROTARY JOINT WITH FLAT CONDUCTOR AND CIRCULAR CONDUCTOR

This application is based on and claims the benefit of German Patent Application No. 198 25 692.2 filed Jun. 9, 1998, which is incorporated by reference herein.

BACKGROUND OF THE INVENTION

The invention relates to a rotary joint with two housing parts rotatable in relation to each other, which are connected by a flexible flat conductor that extends in spires within an interstice between the housing parts and is attached at its end to a contact element, which connects a strand of the flat conductor with a circular conductor and which is arranged in a holder in a housing part.

The problem of suitable current or signal transmission between parts of an apparatus that can be rotated in relation to each other within a limited angular range is frequently encountered. For example, a permanent, reliable connection to supply power to deploy the airbag in a motor vehicle steering wheel is of decisive importance. Since sliding contacts are unsuitable for this purpose due to wear and fluctuating contact resistance, rotary joints with flat conductors have been developed to ensure safe connection.

The flat conductor (hereinafter referred to as FFC) is arranged in the interstice between two rotary joint housing parts rotatable in relation to each other and is attached at its ends to the two housing parts. It is normally made of one or several copper strips spaced at a distance from each other and embedded between two plastic strips. In the simplest case, the flat conductor extends helically like a clock spring. On relative rotation of the housing parts, the diameter and the spire number changes as a function of the direction of rotation. As an alternative, the spires of the flat conductor extend along the inner and outer radial walls of the interstice in opposite directions of rotation, whereby there is a reversing point between the two conductor segments. In this case, upon relative rotation of the housing parts of the joint, the conductor is unwound from one wall and taken up by the other. It is also well known to arrange guiding or elastic elements within the interstice and to make the flat conductor from an elastic material to ensure its safe guidance upon rotation of the housing parts and to prevent damage.

The exterior contacting of the rotary joint is generally effected by wires or stranded conductors with an approximately circular cross-section. Consequently, contact elements have to be provided, which electrically connect the circular conductors with the strands of the flat conductor. Such a contact element is described, for example, in DE 196 04 797 A1. Its design is complex, however, which is a disadvantage particularly if production lots are small, since forming dies are required to produce the contact element. Furthermore, the described contact element has relatively large dimensions and is arranged in the radial outer wall of the rotary joint. Since many functional elements are disposed on the steering wheel of a motor vehicle, the corresponding mounting space is frequently not available.

SUMMARY OF THE INVENTION

Against this background, it is an object of the invention to develop a rotary joint with a contact element for connecting the circular conductor and the flat conductor, which permits simple and low-cost production even for small production lots and which is distinguished by small dimensions.

This object is attained by the invention in that the contact element is made as a single-piece metal part, which has a surface to which the strand of the flat conductor is permanently fixed, the contact element is attached to the circular conductor by crimping, and each contact element is fixed within an associated holder.

The basic idea of the invention is to use a contact element made of a single-piece metal part, e.g., of copper, for connecting the flat conductor of the rotary joint with a circular conductor. The contact element has a preferably flat surface, e.g., a tongue, to which the strand of the flat conductor is permanently fixed. Fixation is by soldering or welding for example, e.g., spot welding or ultrasonic welding. Advantageously, the width of the surface approximately corresponds to, or slightly exceeds, the width of the strand of the flat conductor. Particularly suitable is a flat conductor made of ribbon-type copper conductors which are laminated with plastic foil. Alternatively, any other type of flat conductor may be used. The contact element is fixed to the circular conductor by crimping, preferably by bending tabs along the rim of the contact element around the circular conductor and by deforming them together with the circular conductor to create an easily produced connection that can be subjected to mechanical stress. To improve the stability under load, several pairs of tabs may be provided, which can be crimped to the conductive core of the circular conductor as well as to its insulation.

Since the contact elements are made of an electrically conductive material, each must be arranged within a respective holder of the rotary joint to insulate the strands with respect to each other, whereby the housing parts of the rotary joint are advantageously made of an insulating plastic material. The contact elements and holders are formed so as to provide permanent fixation through positive locking. This prevents any transfer of tensile loads between circular conductor and flat conductor. The number of contact elements corresponds to the number of flat conductor strands to be contacted, whereby either one or both ends of the flat conductor may be provided with such contact elements. Providing a corresponding number of holders in the rotary joint makes it possible to vary the number of contact elements used in order to adapt to flat conductors with different numbers of strands. The holders and thus the contact elements are advantageously arranged parallel and adjacent to each other.

Using single-piece metal parts as the contact elements makes it possible to produce the inventive rotary joints at low cost and with little complexity. Suitable contact elements are, for example, stampings that can be produced in large quantities at low cost. It is possible to use commercially available stampings, which are suitable for crimping to a circular conductor and for welding to a strand of a ribbon or flat conductor. A further advantage is the small size of the contact elements. Their maximum width can be limited to approximately the strand width of the flat conductor. With the flattened form, the maximum thickness is defined by the crimped area and corresponds approximately to the cross-section of the circular conductor. Consequently, the inventive rotary joint is particularly well suited for spatially tight mounting locations.

Due to the small dimensions of the contact elements, it is possible in one advantageous embodiment of the invention to arrange their holders in an extension of a housing part. Particularly advantageous is the arrangement of the extension on an axial end face of the rotary joint. Thus, the radial diameter of the rotary joint can be limited to the value required for receiving the spires of the flat conductor, while the contact elements are disposed above or below the plane of the spires. The transition of the flat conductor from the plane of its spires to the extension is advantageously accomplished by folding it along a line extending at a 45° angle to its longitudinal axis so that it bends at a right angle.

The contact element is preferably latched within its holder. Suitable for this purpose are, for example, barbed spring arms between which the crimping area of the contact element is inserted. The contact element is preferably inserted in its holder at a right angle to the longitudinal axis of the circular conductor.

It is furthermore proposed to seal the holder with a cover to prevent any unintended detachment of the contact element. The cover can be fixed on the rotary joint, for example, by latching or insertion into guides. To simplify assembly, a single cover is preferably used to seal all the holders at one end of the flat conductor. Even in conjunction with a cover, latching the contact elements within their holders is useful to fix them in their position during assembly of the rotary joint before the cover is added.

To prevent stress on the connection with the contact element, it is advantageous to provide strain relief of the flat conductor between the contact element and its spires, preferably through the cover. A particularly advantageous strain relief consists in pressing a segment of the flat conductor with the cover against a surface of the housing part. To improve the strain relief, the cover and/or the surface of the housing part is preferably provided with a rough, e.g. corrugated, surface in the area of the compression.

Even if the forces acting on the circular conductor are relatively large, the unintended detachment of a contact element from its holder must be prevented. It is therefore proposed to provide the contact element with an exposed area, which engages with an opposite surface of a housing part and fixes the contact element against displacement in the axial direction of the circular conductor. It is feasible, for example, to prevent any motion in the direction of the circular conductor by a barb-type exposed area, which reaches behind a projection of the housing part or engages with a recess. Displacement in the opposite direction can be prevented by fitting the end face of the contact element against a stop of the housing part.

To fix the contact element in the above-described position, a flexible element of the cover, which presses the contact element in the direction of the undercut, is advantageous. Likewise, a flexible cover element, e.g. a leaf spring, can exert pressure on the connection between flat conductor and contact element and thus support it.

To enhance the strain relief of the circular conductor, it is proposed to apply radial pressure on the crimp connection. For this purpose, elements of the cover, e.g., projections, are advantageously used to produce the pressure. The elements can either fit directly against the crimp connection or produce pressure through components positioned therebetween. The elements, for example, can be pushed into gaps of latching elements in which the crimp connections are inserted.

BRIEF DESCRIPTION OF THE DRAWING

Below, an exemplary embodiment of the invention is explained in further detail with reference to the drawing, wherein:

FIG. 4A is a cross-sectional view taken along line A—A of FIG. 4.

DETAILED DESCRIPTION OF THE INVENTION

Figure 1:
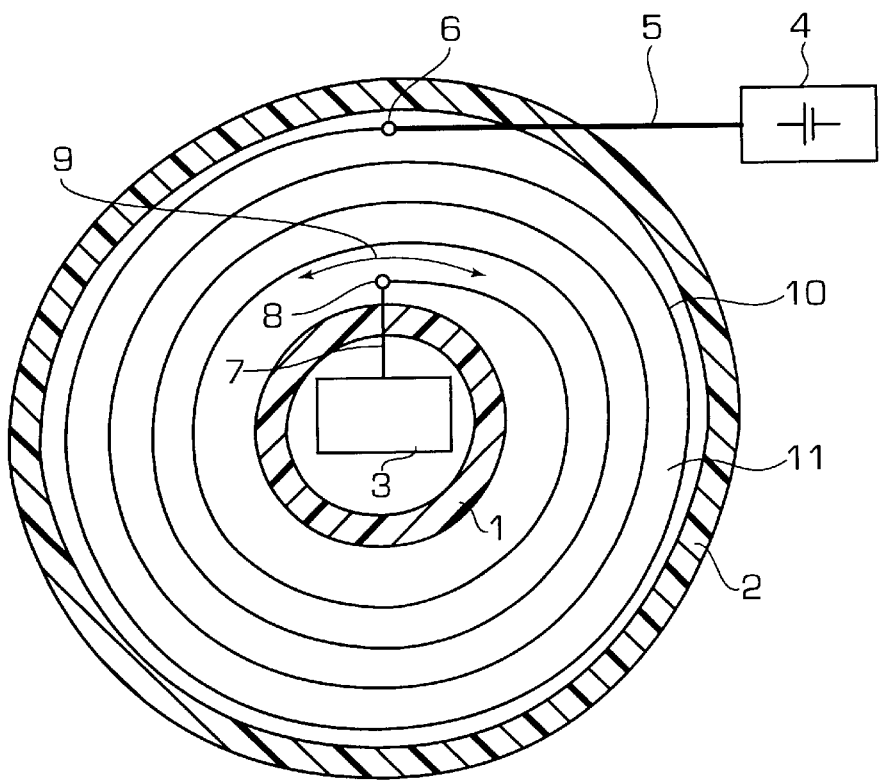
FIG. 1 shows a schematic cross-section through a rotary joint.

FIG. 1 shows the schematic construction of a rotary joint. It comprises an inner housing part (1) and an outer housing part (2), which are rotatable with respect to each other. The rotary joint, for example, serves to supply power to the airbag in the steering wheel of a motor vehicle, whereby the inner housing part (1) is mounted on the steering column. The rotary joint connects the igniter (3) of the airbag to an electronic triggering device (4), which is permanently mounted on the vehicle body and is supplied by the vehicle battery or the vehicle's electrical distribution system. The igniter (3) and the electronic triggering device (4) are connected with the rotary joint via circular conductors (5, 7) which are connected to a flat conductor (10) at connecting points (6, 8). The flat conductor (10) extends in spires like a clock spring within an interstice (11) of the housing parts (1, 2). If the housing parts are rotated with respect to each other in the direction of the double arrow (9), the number and the diameter of the spires of the flat conductor (10) change. If the flat conductor (10) is sufficiently long, an end-to-end electrical connection between the housing parts (1, 2) is ensured over a limited number of rotations.

Figure 2:
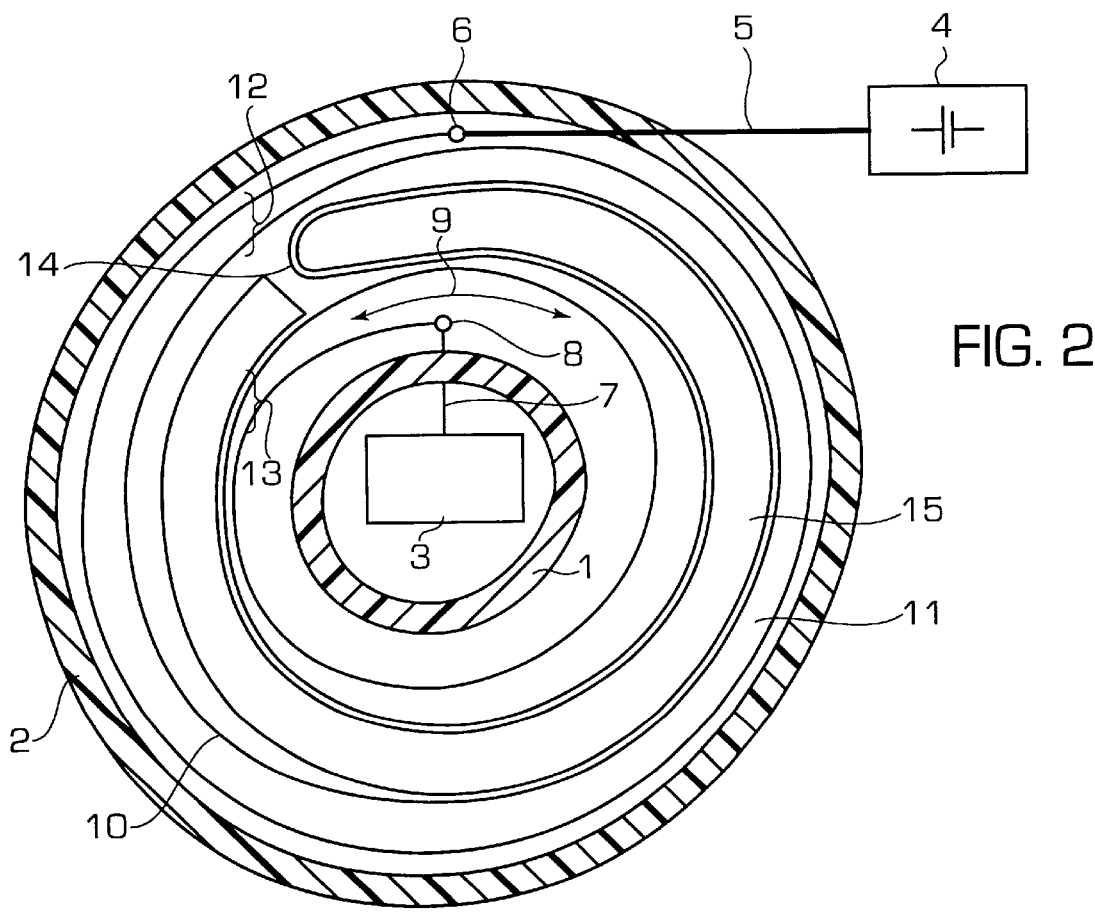
FIG. 2 shows a schematic cross-section through an alternative embodiment.

FIG. 2 schematically shows an alternative embodiment of the rotary joint wherein a first segment (12) of the flat conductor (10) along the wall of the outer housing part (2) has an opposite winding direction to the second segment (13) on the wall of the inner housing part (1). Between the two segments (12, 13), there is a reversing point (14) of the flat conductor (10). Upon relative rotation of the housing parts (1, 2) in the direction of the double arrow (9), one of the segments (12, 13) is unwound as a function of the direction of rotation while the other segment (13, 12) takes up the flat conductor (10). A guiding element (15) can be provided to increase functional safety.

Figure 3:
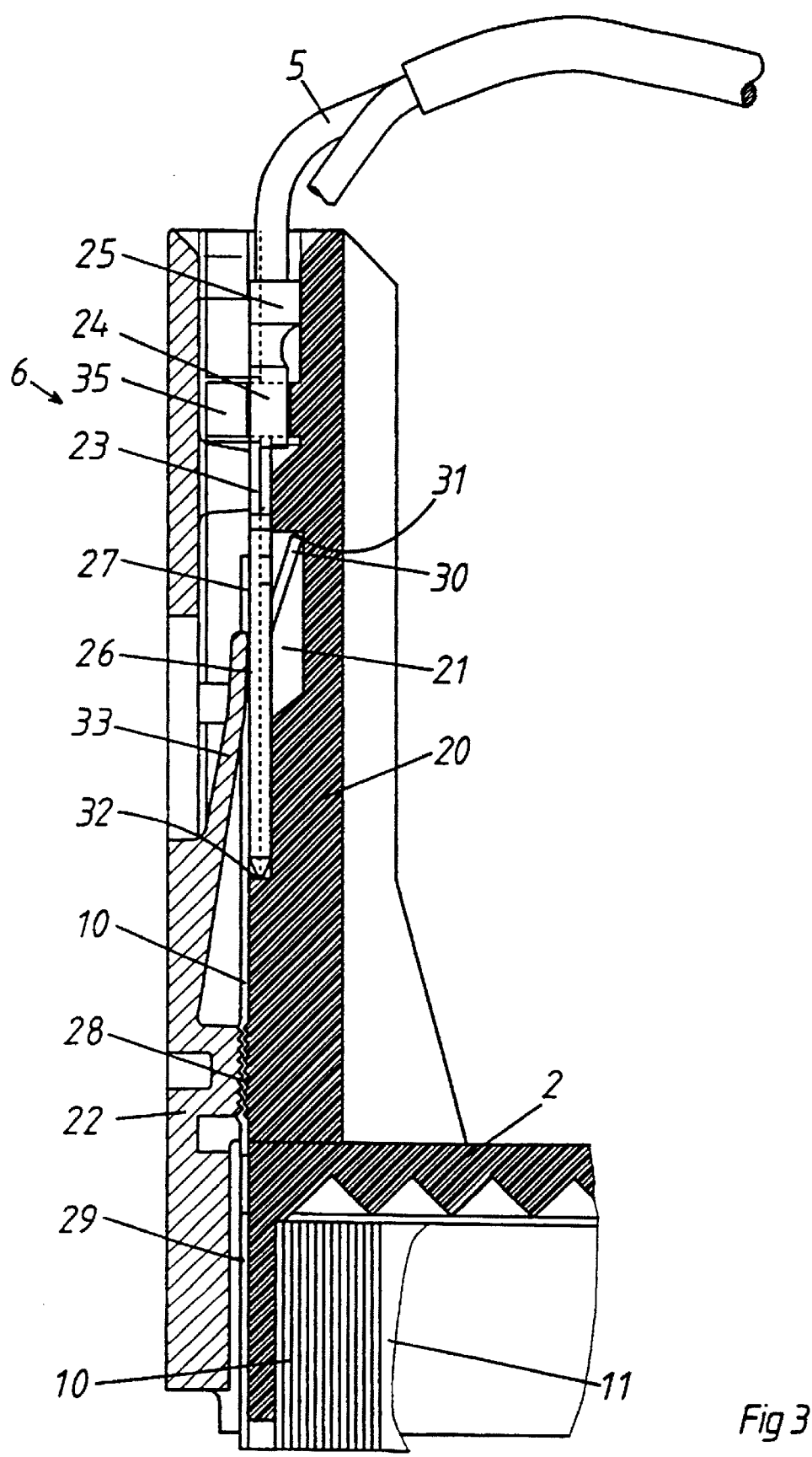
FIG. 3 shows a section through an inventive rotary joint in the area of the contact element perpendicular to the plane of the spires of the flat conductor.

FIG. 3 is a section parallel to the rotary axis of an inventive rotary joint through connection point (6) between the circular conductors (5) and the flat conductor (10). The connection point (6) is arranged in an extension (20) of the housing part (2) in a holder (21), which is sealed with a cover (22). Electrical connection is effected by a contact element (23), which is fixed in the holder (21). To contact the circular conductor (5), the contact element (23) is provided with a pair of tabs (24) that are crimped around the conductor of a circular conductor (5). An additional pair of tabs (25) is crimped around the insulation of the circular conductor (5) and thus improves its fixation. The lower part of the contact element (23) is formed by a surface (26) to which a strand (27) of the flat conductor (10) is attached, preferably by welding. From contact element (23), the flat conductor (10) extends through a strain relief device. This device is formed by corrugated surfaces (28) of the housing part (2) and the cover (22), which fit against the flat conductor (10) on either side under initial tension. In a folding region (29), which is also covered by cover (22), the flat conductor (10) bends perpendicularly to the drawing plane before it is guided through a gap in the housing part (2) (not shown) into the interstice (11) of the two housing parts (1, 2).

For positive locking in the holder (21), the contact element (23) is provided with a tab (30) formed by an exposed area of surface (26). By interacting with an opposite surface

(31) of the holder (21), this tab (30) acts as a barb to prevent the contact element (23) from moving in the direction of the circular conductor (5). Fixation against movement in the opposite direction is effected by a stop (32) against which the end face of the contact element (23) sits. To improve the fixation, cover (22) is provided with a spring element (33) that presses the contact element (23) into the holder (21) of the extension (20) of the housing part (2). This ensures that tab (30) securely engages with opposite surface (31) and that the end-face of the contact element (23) fits against stop (32). The spring element (33) is advantageously located in the area of the weld between the surface (26) and the strand (27) of the flat conductor (10) so that this connection is also supported.

Figure 4A:
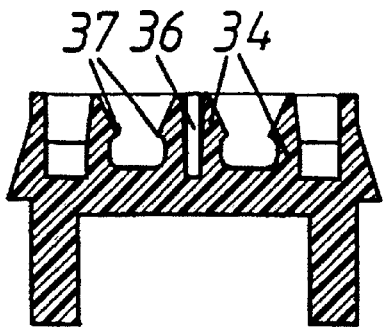
FIGS. 4A and 4B are views of the holder of the contact element shown in FIG. 3.
Figure 4B:
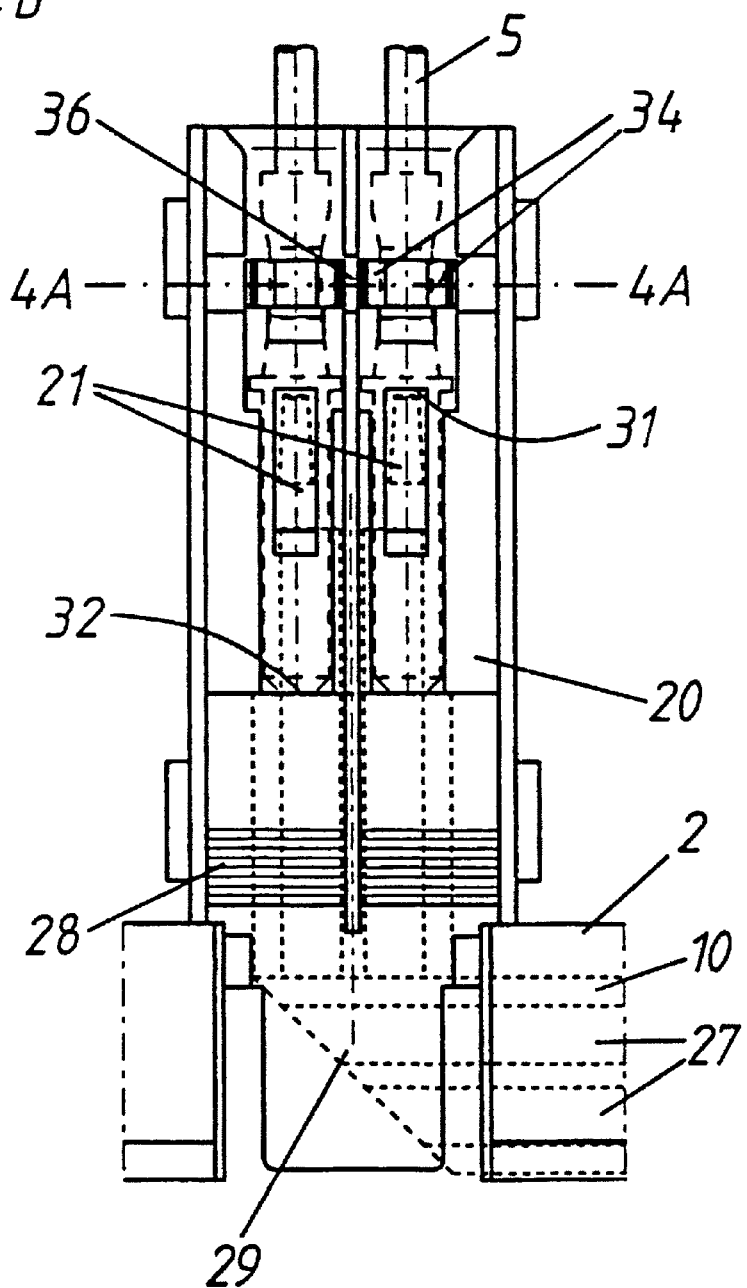

FIG. 4 shows a view of the extension (20) of the housing part (2) without the cover (22). The contact elements (23) and the course of the flat conductor (10) within the folding area (29) are indicated by a dashed line. The extension (20) is provided with holders (21) for two contact elements (23). Of course, holders (21) for additional contact elements (23) can be arranged adjacent thereto. The holders (21) are provided with pairs of spring arms (34) which are shown in detail in section A—A of FIG. 4A and have raised parts or barbs (37) on the inside. Between the spring arms (34), the crimp area of the contact elements (23) can be latched so as to ensure an adequate hold even before the cover (22) is added. This significantly facilitates assembly. The cover (22) is preferably provided with projections (35) that engage with interstices (36) of the spring arms (34) and thus fix them in their position. As the cover (22) is added, the contact element (23) is locked between the spring arms (34) to prevent any unintentional detachment of the latching.

This creates a rotary joint, which can be produced at low cost even for small production lots and which is small in size due to the dimensions and the arrangement of its contact elements.

What is claimed is:

1. A rotary joint with two housing parts (1,2) rotatable in relation to each other, which are connected by a flexible flat conductor (10) that extends in spires within an interstice (11) of the housing parts (1,2), is attached at an end thereof to a contact element (23) that connects a strand (27) of the flat conductor (10) with a circular conductor, and is arranged in a holder (21) of one of the housing parts, wherein the contact element (23) is an elongated single-piece metal part having a surface (26) to which the conductor strand (27), is permanently connected, the contact element (23) being attached to the circular conductor by crimping to form a crimped connection, wherein the contact element (23) has means that engages with the said one housing part and fixes the contact element (23) against displacement in both longitudinal directions thereof, wherein the contact element (23) is provided with a tab (30) interacting with an opposite surface (31) of said holder (21), and wherein the contact element (23) has a free end face thereof abutting a stop (32) which is positioned within said holder (21).

2. The rotary joint according to claim 1, wherein the holder (21) is arranged in an extension (20) of said one housing part.

3. The rotary joint according to claim 1, wherein the contact element (23) is latched within the holder (21).

4. The rotary joint according to claim 1, wherein the holder (21) is sealed with a cover (22).

5. The rotary joint according to claim 4, wherein the cover (22) presses the flat conductor (10) against a surface (28) of said one housing part.

6. The rotary joint according to claim 4, wherein the cover (22) has a spring element (33) applying pressure on the contact element (23) in a direction toward the holder (21) or on the flat conductor (10) in a direction toward the contact element (23).

7. The rotary joint according to claim 4, wherein the cover (22) forms said strain relief device.

8. The rotary joint according to claim 7, wherein the cover (22) has means to apply radial pressure on the crimp connection.

* * * * *